(12) United States Patent
McKeown et al.

(10) Patent No.: US 11,987,229 B2
(45) Date of Patent: May 21, 2024

(54) ADAPTIVE BRAKING AND DIRECTIONAL CONTROL SYSTEM (ABADCS)

(71) Applicant: EAGLE AEROSPACE LTD., Campbellford (CA)

(72) Inventors: Stephen Lyle McKeown, Campbellford (CA); Ty Shattuck, Burlington (CA); Paul Edward Cudmore, Castleton (CA)

(73) Assignee: Eagle Aerospace Ltd., Campbellford (CA)

( * ) Notice: Subject to any disclaimer, the term of this patent is extended or adjusted under 35 U.S.C. 154(b) by 403 days.

(21) Appl. No.: 17/258,229

(22) PCT Filed: Jul. 4, 2019

(86) PCT No.: PCT/CA2019/050927
§ 371 (c)(1),
(2) Date: Jan. 6, 2021

(87) PCT Pub. No.: WO2020/006641
PCT Pub. Date: Jan. 9, 2020

(65) Prior Publication Data
US 2021/0284127 A1    Sep. 16, 2021

Related U.S. Application Data

(60) Provisional application No. 62/694,719, filed on Jul. 6, 2018.

(51) Int. Cl.
*B60W 10/184*   (2012.01)
*B60T 8/17*     (2006.01)
(Continued)

(52) U.S. Cl.
CPC ......... *B60W 10/184* (2013.01); *B60T 8/1703* (2013.01); *B60T 8/171* (2013.01);
(Continued)

(58) Field of Classification Search
CPC .... B60W 10/184; B60W 10/20; B60W 30/09; B60W 40/064; B60W 50/14;
(Continued)

(56) References Cited

U.S. PATENT DOCUMENTS

| 7,177,743 B2 | 2/2007 | Roy |
| 2005/0137786 A1* | 6/2005 | Breed ................. G05D 1/0246 701/482 |

(Continued)

FOREIGN PATENT DOCUMENTS

| EP | 1 302 356 A1 | 4/2003 |
| GB | 2 505 020 A | 2/2014 |

(Continued)

OTHER PUBLICATIONS

International Search Report dated Sep. 11, 2019 for corresponding International Application No. PCT/CA2019/050927.

(Continued)

*Primary Examiner* — Jason Holloway
(74) *Attorney, Agent, or Firm* — Pearne & Gordon LLP (57) ABSTRACT

A method of controlling and optimizing braking and directional control of a vehicle operated on a contaminated, compliant, or non-compliant surface. The method includes steps of: collecting data from a plurality of sensors, the data being indicative of a condition of the contaminated, compliant, or non-compliant surface; sending the data to a neural controller having an algorithm configured to process the data. The algorithm includes: determining optimum braking and directional control instructions for the vehicle, generating warnings and alerts based on the calculated optimum braking and directional control instructions, and sending the optimum braking and directional control instructions to a braking and steering system of the vehicle and the warnings and alerts to an alert and warning system of the vehicle. The (Continued)

method further includes adjusting the steering and directional control of the braking and steering system in accordance with the optimum braking and directional control instructions provided by the neural controller.

17 Claims, 3 Drawing Sheets

(51) Int. Cl.
| | | |
|---|---|---|
| *B60T 8/171* | (2006.01) | |
| *B60W 10/20* | (2006.01) | |
| *B60W 30/09* | (2012.01) | |
| *B60W 40/064* | (2012.01) | |
| *B60W 50/14* | (2020.01) | |
| *B60T 8/1764* | (2006.01) | |
| *B60W 50/00* | (2006.01) | |

(52) U.S. Cl.
CPC ............ *B60W 10/20* (2013.01); *B60W 30/09* (2013.01); *B60W 40/064* (2013.01); *B60W 50/14* (2013.01); *B60T 8/1764* (2013.01); *B60W 2050/0075* (2013.01); *B60W 2540/12* (2013.01); *B60W 2556/45* (2020.02); *B60W 2710/18* (2013.01); *B60W 2710/20* (2013.01)

(58) Field of Classification Search
CPC ..... B60W 2050/0075; B60W 2540/12; B60W 2556/45; B60W 2710/18; B60W 2710/20; B60W 40/06; B60W 60/0015; B60W 2540/18; B60W 10/18; B60W 30/095; B60T 8/1703; B60T 8/171; B60T 8/1764; B60T 2210/122; B60T 2210/14; B60T 2201/022; B60T 2260/02; B60T 7/22; B60T 8/174; B60T 8/1755; B64C 25/48; B64C 25/46

See application file for complete search history.

(56) References Cited

U.S. PATENT DOCUMENTS

| | | | |
|---|---|---|---|
| 2007/0152804 A1* | 7/2007 | Breed | .................... G01S 19/17 |
| | | | 701/301 |
| 2012/0101701 A1* | 4/2012 | Moshchuk | ............ B60W 30/09 |
| | | | 701/70 |
| 2016/0379065 A1 | 12/2016 | Hartmann | |
| 2017/0043774 A1* | 2/2017 | Kelly | .............. B60W 30/18172 |
| 2018/0032082 A1* | 2/2018 | Shalev-Shwartz | ... G05D 1/0246 |
| 2018/0107215 A1 | 4/2018 | Djuric et al. | |
| 2018/0134266 A1 | 5/2018 | McKeown et al. | |
| 2019/0232970 A1 | 8/2019 | Watanabe et al. | |

FOREIGN PATENT DOCUMENTS

| | | |
|---|---|---|
| JP | H10-230831 A | 9/1998 |
| JP | 2006-007823 | 1/2006 |
| JP | 2006-327367 A | 12/2006 |
| JP | 2007-050886 A | 3/2007 |
| JP | 2007-223494 A | 9/2007 |
| JP | 2011-046219 A | 3/2011 |
| JP | 2017-503715 A | 2/2017 |
| JP | 2018-039401 A | 3/2018 |
| JP | 2018-091794 | 6/2018 |
| WO | 2015/057832 A1 | 4/2015 |
| WO | 2017/157863 A1 | 9/2017 |

OTHER PUBLICATIONS

Written Opinion dated Sep. 11, 2019 for corresponding International Application No. PCT/CA2019/050927.
Supplementary European Search Report dated Mar. 9, 2022 for corresponding European Application No. EP19830336.4.
Office Action issued in corresponding Japanese application, 2021-500301, dated Jun. 27, 2023.
Office Action issued in corresponding Japanese application, 2021-500301, mailed Jan. 23, 2024.

* cited by examiner

FIG. 1

FIG. 2
ABADCS Neural Controller

FIG. 3
ABADCS Neural Model

ADAPTIVE BRAKING AND DIRECTIONAL CONTROL SYSTEM (ABADCS)

CROSS REFERENCE TO RELATED APPLICATIONS

This application claims the benefit of U.S. Provisional Patent Application No. 62/694,719, filed Jul. 6, 2018, the disclosure of which is incorporated in its entirety herein by reference.

FIELD

The present disclosure relates generally to vehicle braking and directional control systems, and more particularly to systems that are designed to optimize the braking and steering response of a vehicle.

BACKGROUND

The term "vehicle" is used hereinafter to refer to any vehicle that is stopped using wheel brakes, including, but not limited to cars, trucks, aircraft, military vehicles, vocational vehicles, recreational vehicles, etc. Current vehicle braking and directional control systems have no sensory or other inputs for recognizing what type of contaminant (e.g., rain, snow, gravel, etc.) is on a surface or for recognizing the type of surface a vehicle is traveling on. As a result, such control systems are incapable of adjusting or optimizing their performance for such differing conditions.

Current anti-lock braking systems (ABS) and anti-skid braking systems (ASBS) prevent wheels from locking, skidding, decelerating too rapidly, and/or, decelerating beyond a certain slip ratio. The slip ratio is measured relative to a ground speed of the vehicle or with respect to other wheels of the vehicle.

These systems may be linear manual, analogue, mechanical, hydraulic, electric, electronic, digital (fly by wire, steer by wire) or hybrid systems. In these systems, a person or computer (e.g., during autonomous operation) controls the steering of the vehicle based on hand, foot, electronic or computer controls. These controls turn the wheels and or rudders and input a yawing or lateral rotation around the vehicle's center of gravity ("CoG"). The response of the vehicle to the foregoing steering input may also be assisted by stability control systems.

One drawback to these systems is that they are optimized to function on dry pavements. The operating algorithms utilized in these systems try to maintain slip ratios within the low values associated with threshold braking on dry pavement or hard non-compliant surfaces, usually around the 10-20% range. Although some tires are designed and manufactured to optimize performance on different kinds of surfaces (e.g., sipes and grooves in snow tires), current brake systems use the same control methodology regardless of whether the vehicle is on dry pavement, or other surfaces. However, the response of the vehicle will vary based on the conditions of the surface and the type of surface.

One other drawback to current systems is that the various control systems of the vehicle tend to act independent of each other although they often manipulate the same systems of the vehicle. For example, ABS vehicles and ASBS aircraft often do not decelerate as quickly on pavements contaminated with snow. As a result, wheel and rudder steering may not respond quickly to control input from the operator because the ABS and ASBS may cause, or allow viscous hydroplaning of the vehicle tires.

The present application provides a system that optimizes the braking and steering capabilities of a vehicle while taking into account the conditions of the surface upon which the vehicle is travel.

BRIEF SUMMARY

There is provided an adaptive braking and directional control system (ABADCS) for ground and aircraft vehicles that includes: a plurality of sensors and digital data connections/inputs of all available current and expected future sources of data describing current operating conditions of a vehicle including, but not limited to, velocity, optimum/adaptive pavement braking and or steering traction, and an ABADCS equipped vehicle's changing velocities and resulting current time interaction with fixed infrastructure (GIS) and moving obstacles (other vehicles, etc.); an adaptive control processing system including an artificial intelligence enabled adaptive braking subsystem that engages when more braking or steering is requested by the driver than is provided by the tires on contaminated or non-clean, non-dry, non-high traction pavement and then uses the data from the plurality of sensors to determine the optimum braking and steering actions, where optimum is defined as the safest intersection of highest braking forces, highest steering forces, and most probable obstacle and hazard avoidance path; and a user feedback system including a set of tactile, audible and visual warnings, alerts and feedback methods that improve the driver's situational awareness in the contaminated driving conditions The aforementioned vehicle may be operated in a manner where the operator is either unaware of, or ignores real time operating conditions. It is contemplated that the ABADCS may alert the operator, through audio and or visual and or tactile, alerts to the presence of operating conditions that are adverse to the safe operation of the vehicle. It is contemplated that the ABADCS may allow the operator to operate the vehicle in a manner that prevents ABADCS from assisting in the safe operation of the vehicle. For example, the operator may simply drive too fast to allow a vehicle to stop in a required distance or to be steered safely around an obstacle. In an instance where ABADCS cannot assist the operator in achieving braking and/or directional control, the ABADCS may be configured to default to cadence braking if steering is asked for by the operator, and analogue braking if no steering is asked for by the operator (for lack of directional control (example—understeer) or recovery of directional control (examples—'fishtailing' or oversteer)).

There is provided a method of controlling and optimizing braking and directional control of a vehicle operated on a contaminated, compliant, or non-compliant surface. The method includes steps of: collecting data from a plurality of sensors, the data being indicative of a condition of the contaminated, compliant, or non-compliant surface; sending the data to a neural controller having an algorithm configured to process the data, The algorithm includes: determining optimum braking and directional control instructions for the vehicle, generating warnings and alerts based on the calculated optimum braking and directional control instructions, and sending the optimum braking and directional control instructions to a braking and steering system of the vehicle and the warnings and alerts to an alert and warning system of the vehicle. The method further includes a step of adjusting the steering and directional control of the braking and steering system in accordance with the optimum braking and directional control instructions provided by the neural controller.

In the foregoing method, it is contemplated that after the step of generating warnings and alerts, there may be a step of generating an arming signal to a semi or fully autonomous braking system to pre-arm the braking and steering system based on real time conditions that may still be present when vehicle needs to be braked, and or directionally controlled.

It is also contemplated that the method may include a step of sending a command from a user to the braking and steering system of the vehicle to increase braking or steering in excess of the optimum braking and steering instructions provided by the neural controller.

In the foregoing method it is contemplated that the user may be at least one of a person, a computer and an autonomous machine computer.

It is also contemplated that the neural controller may be activated prior to detecting the contaminated, compliant, or non-compliant surface.

It is also contemplated that the vehicle may be one of a manual, a semi-autonomous and an autonomous vehicle.

In the foregoing method the neural controller may be configured to repeatedly monitor the condition of the contaminated, compliant, or non-compliant surface and send updated braking and directional control instructions to the braking and steering system of the vehicle.

In the foregoing method the neural controller may be configured to repeatedly monitor the condition of the contaminated, compliant, or non-compliant surface and send updated braking and directional control instructions to the braking and steering system of the vehicle wherein the algorithmic pre-arming of the semi and fully autonomous braking systems can be adapted in real time based on the real time conditions.

It is also contemplated that the neural controller may be part of a network that includes a plurality of neural controllers in other vehicles. In such a network the neural controller may communicate with the plurality of neural controllers for relaying data regarding the contaminated or non-compliant surface.

It is further contemplated that the neural controller may be configured to use data for the plurality of neural controllers for adjusting the braking and directional control instructions sent to the braking and steering systems of the vehicle.

In the foregoing method, the neural controller may be part of a network that includes a plurality of neural controllers in other vehicles. In such a network the neural controller may communicate with the plurality of neural controllers for relaying alerts and warnings regarding the contaminated or non-compliant surface.

In the foregoing method the maximum braking force may not exceed a level causing unacceptable damage to tires or other components of the vehicle.

It is further contemplated that the neural controller may be configured to adjust the optimal braking and directional control instructions to reduce the risk of tire failure.

In the foregoing method, the vehicle may be an aircraft.

The present invention may also provide an apparatus for controlling and optimizing braking and directional control of a vehicle. The apparatus may include a plurality of sensors configured to determine a condition of the contaminated, compliant, or non-compliant surface, an alert and warning system, a braking and steering system of the vehicle; and a controller. The controller may be configured to: collect data from the plurality of sensors, the data being indicative of the condition of the contaminated, compliant, or non-compliant surface; send the data to a neural controller having an algorithm configured to process the data. The algorithm may include: determining optimum braking and directional control instructions for the vehicle, generating warnings and alerts based on the calculated optimum braking and directional control instructions, and sending the optimum braking and directional control instructions to the braking and steering system of the vehicle and the warnings and alerts to an alert and warning system of the vehicle. The controller may be further configured to adjust the steering and directional control of the braking and steering system in accordance with the optimum braking and directional control instructions provided by the neural controller.

In the foregoing apparatus the vehicle may be an aircraft.

In the foregoing apparatus the algorithm may include generating warnings and alerts, a step of generating an arming signal to a semi or fully autonomous braking system to pre-arm the braking and steering system based on real time conditions that may still be present when vehicle needs to be braked, and or directionally controlled.

DESCRIPTION OF EXAMPLE EMBODIMENTS

Figure 1:
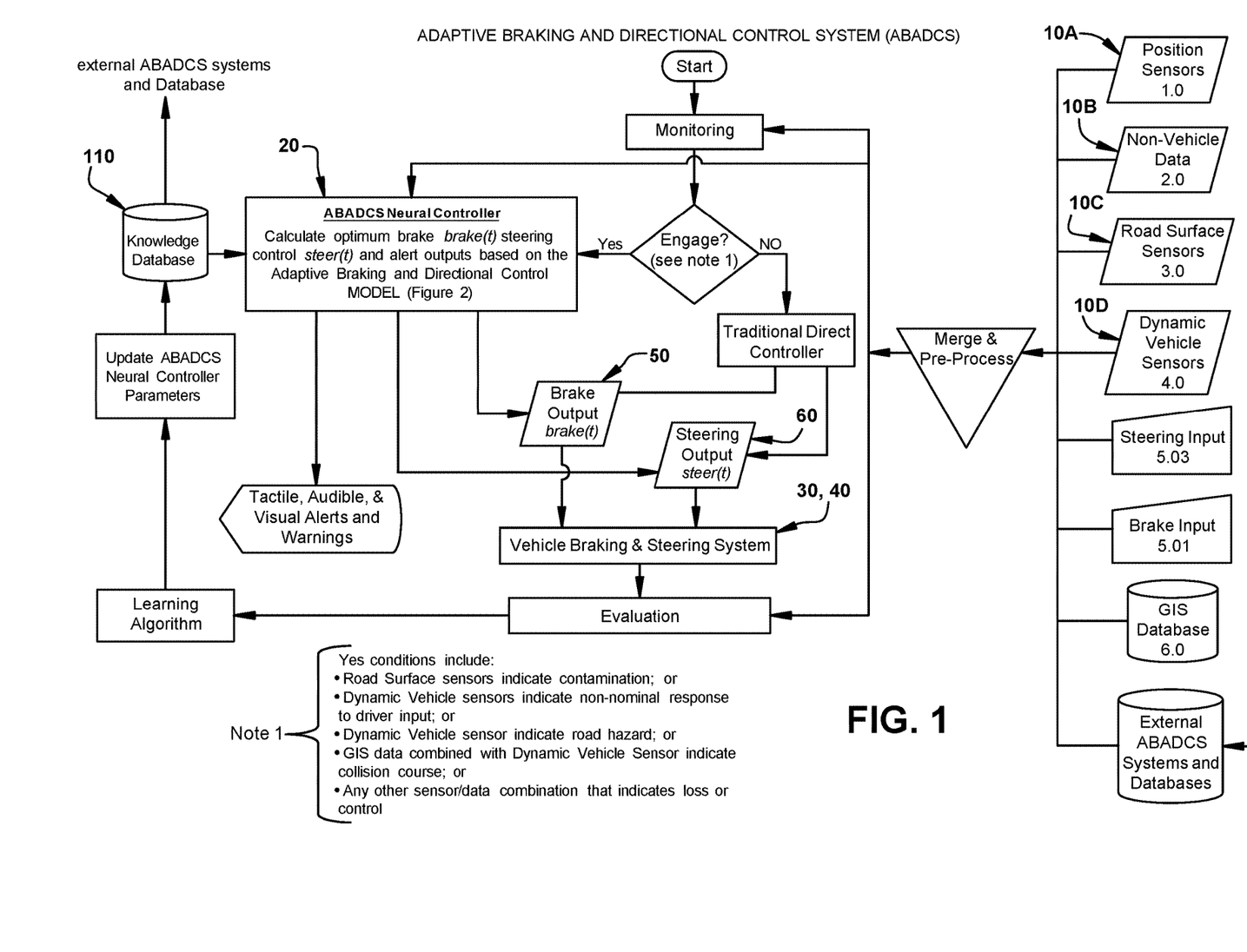
FIG. 1 is a flow chart illustrating an adaptive braking and directional control system for a vehicle, according to the present invention.

Referring now to the drawings, FIG. 1 illustrates a flow chart showing the operational steps for an adaptive braking and directional control system (ABADCS) for a vehicle, according to the present invention. The system, in general, is initiated by a monitoring step wherein signals provided by a plurality of sensors 10A-D (see FIG. 2) are monitored by a neural controller (see FIG. 2) 20.

Figure 2:
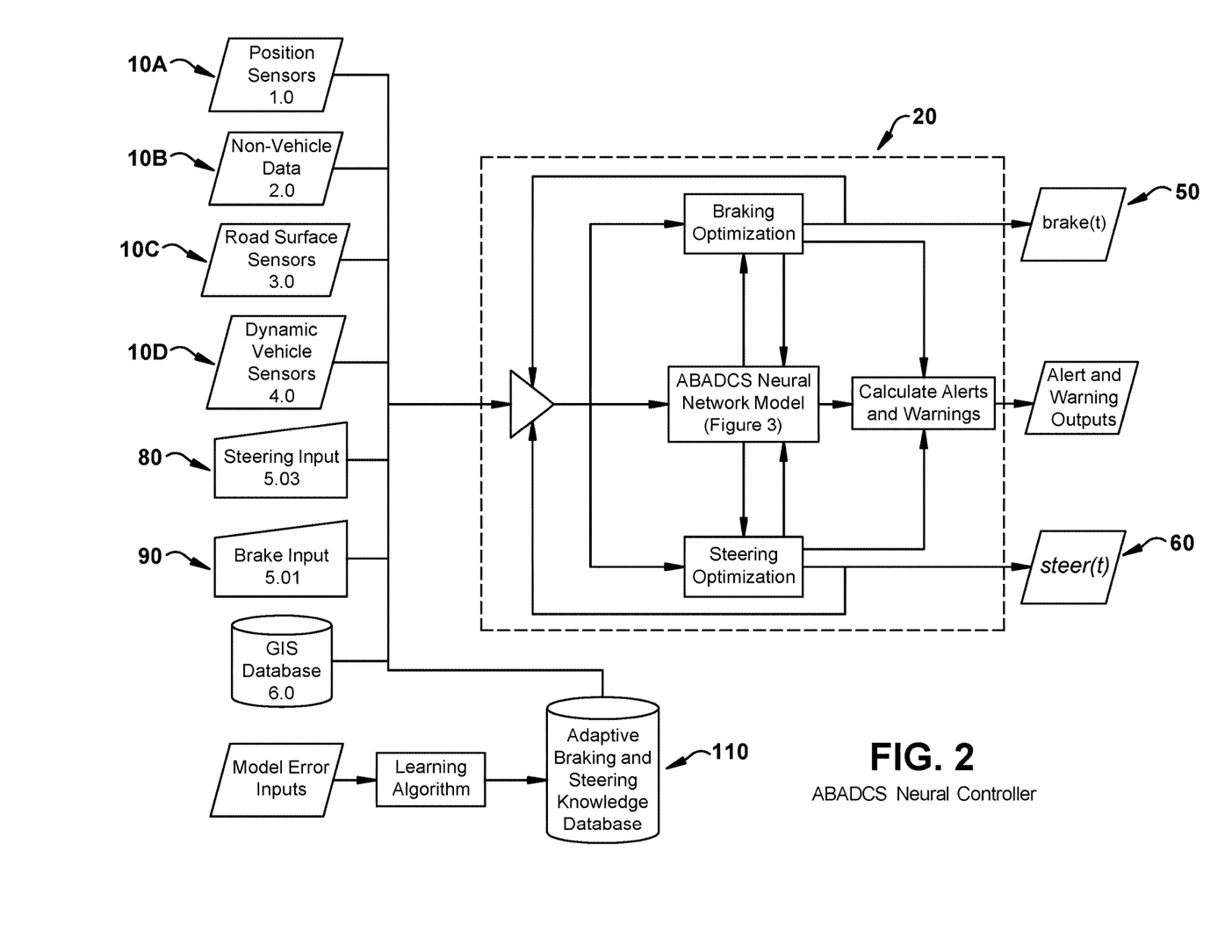
FIG. 2 is a flow chart illustrating a Neural Controller for the control system shown to FIG. 1.

Referring to FIG. 2, the plurality of sensors may include position sensors 10A, non-vehicle sensors 10B, road surface sensors 10C and dynamic vehicle sensors 10D. The position sensors 10A may be configured to provide real-time location data, e.g., latitude, longitude, elevation, etc. for the vehicle. It is contemplate that such position sensors 10A may be configured to provide signals indicative of three dimensional positioning of the vehicle (e.g., from a global positioning system (GPS)), etc.

The non-vehicle sensors 10B may be configured to provide signals indicative of an input from an operator, weather conditions and obstacles in the environment. The non-vehicle sensors 10B may make use of RWIS (Road Weather Information Systems that provide information regarding residual sand, abrasives, chemicals, etc.), 3D infrastructure inputs (like elevation, slope) and other data that will become more available with time from autonomous vehicles and their sensors (like LIDAR, RADAR, GPS/GIS, signage, and hazard notification etc.). It is contemplated that other data may be provided through local area and vehicle to vehicle networks, the internet, or the industrial internet of things through various communications means. In particular, the vehicle sensors may provide signals indicative of the position of a brake pedal, a position of a steering wheel, an amount of turning force applied to the steering wheel, a pressure applied to the brake pedal, steering wheel input.

The road surface sensors 10C may be configured to provide signals indicative of a condition of a surface upon which the vehicle is traveling and a presence and/or condition of contaminants on the surface. In particular, the road surface sensors 10C may be configured to provide signals indicative of: surface temperature, ambient air temperature, surface friction, contaminant drag and rolling resistance, The dynamic vehicle sensors 10D may be configured to provide signals indicative of various dynamic movements of the vehicle, for example, but not limited to vehicle velocity, wheel speeds and tire angular velocities and accelerations, inertial measurements, velocity of the vehicle, braking availability, lateral, longitudinal, and vertical speed and acceleration, axle and wheel lateral forces, brake pressure, wheel braking torque, weight on the wheel(s) of the vehicle, tire pressure, lateral, longitudinal and vertical tire forces, presence/absence and description of equipment attached to the vehicle, yaw, pitch and roll of the vehicle, static and dynamic center of gravity of the vehicle, etc.

Aside from the foregoing explicitly mentioned sensors 10A-10D that provide information to the neural controller 20, it is also contemplated that other vehicle systems, not limited to anti-collision systems, may provide information to the neural controller.

The neural controller 20 may also be configured to receive signals indicative of the commands of an operator of the vehicle. These signals may be in addition to, or duplicates of the information provided by the vehicle and non-vehicle sensors 10B discussed in detail above. Based on the collected information, the neural controller 20 may be programmed to determine the existence/absence of contamination on the surface whereon the vehicle is traveling. In the absence of contamination, the inputs from the operator are directly passed to a brake system 30 and a steering system 40 of the vehicle.

Referring back to FIG. 1, the signals from the foregoing sensors are monitored by the neural controller 20. Based on these signals the neural controller 20 is programmed to determine whether to engage the ABADCS. In particular, the ABADCS is engaged when it is determined that one or more of the following conditions have occurred: 1) the road surface conditions indicate the presence of a contamination on the road surface, 2) the dynamic vehicle sensors 10D provide a signal indicative of a non-nominal response to an input from a driver, 3) the dynamic vehicle sensors 10D indicate the presence of a barrier, 4) GIS data, when combined with Dynamic Vehicle Sensor indicate that the vehicle is on a collision course or 5) any other sensor data indicates a loss of control or correct nominal response of the vehicle. If none of the foregoing conditions occurs, the ABADCS remains inactive but the neural controller 20 continues to monitor the data. As illustrated in FIG. 1, when the ABADCS is bypassed, the brake output and steering output to the vehicle remains unmodified and the vehicle braking and steering system 30, 40 operates without further modification.

However, when the neural controller 20 determines that the ABADCS should be engaged, it calculates an optimal brake as a function of time, brake (t) 50 and an optimal steering as a function of time, steering (t) 60. It is contemplated that the ABADCS may also alert the operator through various sensory feedbacks, e.g., lights, vibration, sound, etc. that the ABADCS will be or is engaged.

Figure 3:
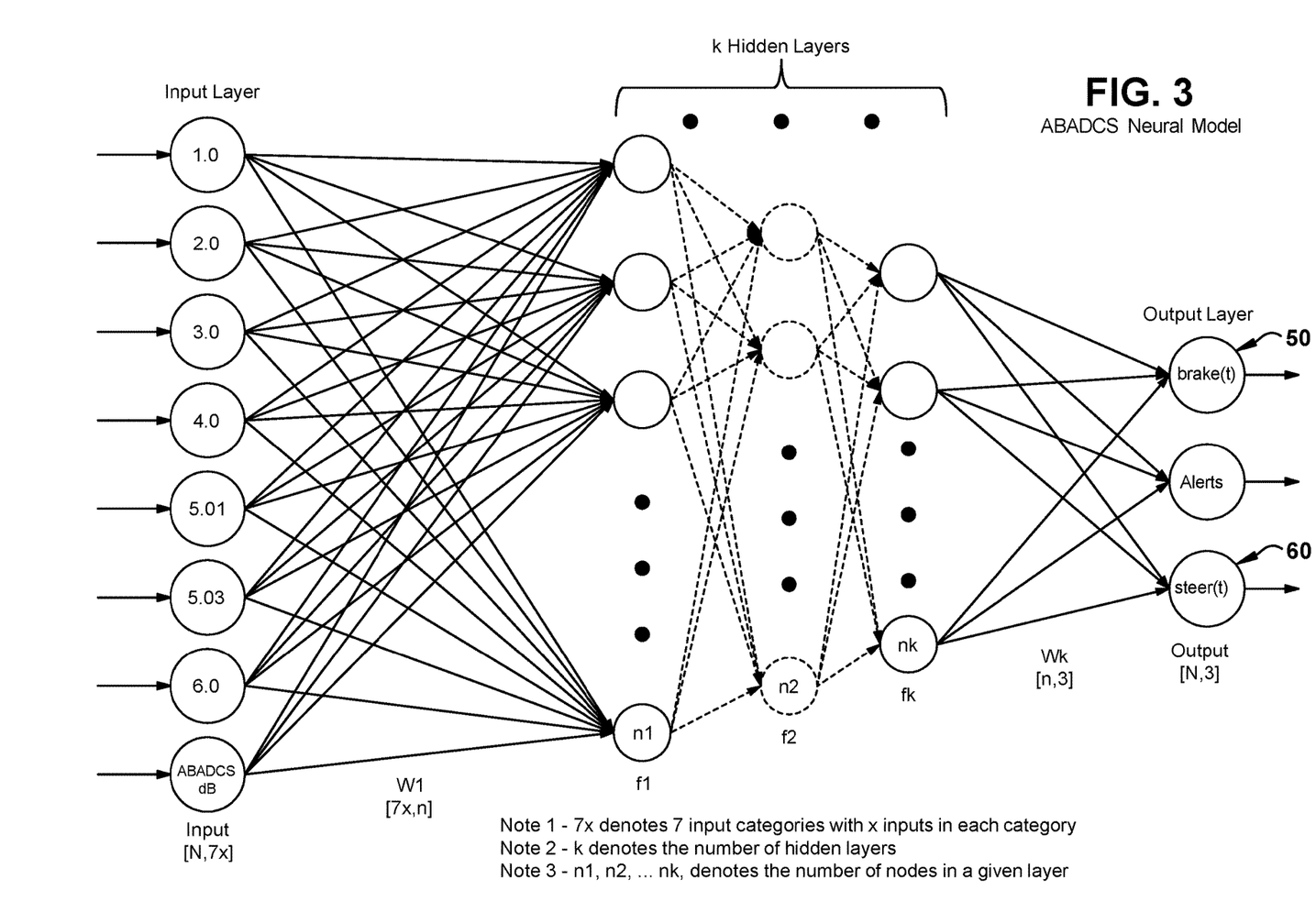
FIG. 3 is a flow chart illustrating a Neural Model for the Neural Controller shown in FIG. 2.

Referring to FIG. 2, the neural controller 20 takes the foregoing sensory data as input and calculates an optimized braking and steering response to the detected surface conditions and the user inputted steering and braking commands. FIG. 3 illustrates how the neural controller 20 takes the inputted sensory data and determines an optimal braking and steering output as a function of time. It is contemplated that the neural controller may be configured to modify the alerts and/or add additional alerts based on the determined braking and steering command. For example, the initial alert provided by the neural controller 20 may simply be an indication to the operator that ABADCS is active, e.g., under normal acceleration the ABADCS monitors and notes that the drive wheels' angular velocities have increased at a rate significantly higher than the non-drive wheels, indicating a slippery or contaminated surface. The updated alert from the ABADCS may indicate to the user that a steering input 80 and/or braking input 90 from the operator is being modified by the ABADCS.

Referring to FIG. 1, the output of the ABADCS may be used as an input back into the ABADCS in an iterative manner to further optimize the braking and the steering output of the ABADCS. Once the calculated braking and steering command has been optimized to a predetermined accuracy, the ABADCS may output the optimal brake, brake (t) 50, the optimal steering, steering (t) 60 and the alerts/warnings to the appropriate systems of the vehicle.

Referring to FIG. 1, the optimal brake, brake (t) 50 and the optimal (only if digital) steering, steering (t) 60 are inputted into the vehicle braking and steering system 30, 40. The output from the vehicle braking and steering system 30, 40, together with the sensory data discussed in detail above, are once again evaluated by the neural controller 20 and the output of this combined evaluation is used to update the algorithm of the neural controller 20. In this respect, the neural controller 20 is a type of learning system that is configured to learn from past situations to improve its operation. It is contemplated that the neural controller 20 may be configured to update its control parameters either automatically or after review and approval by a designated user, e.g., a controller engineer with the appropriate training and knowledge to determine whether the parameters of the neural controller 20 should or should not be updated as calculated by the neural controller. In this respect, the designated user acts as a type of gate keeper to prevent improper modification to the neural controller.

In addition to the foregoing, it is also contemplated that the data collected by various ABADCS's may be collected and stored in external databases 110. This data may be analyzed offline and, when appropriate, updates can be made to all or selected ABADCS's, as needed.

It is contemplated that the present invention may provide better braking and directional control in vehicles operating on contaminated surfaces where optimum friction slip values for both braking and steering are dissimilar to friction-slip values on non-contaminated hard surfaces. The present invention may reduce stopping distances and improve directional stability and control of the vehicle.

In addition to the foregoing, current ABS and ASBS systems do not actively integrate or adjust their reactions to different surfaces with directional control. Rather directional control (by tires), and the traction required that needs to be shared with the braking system while steering and braking at the same time, or, the steering traction that can be optimized by threshold (and or cadence) braking, is passively that traction that is either left over during active ABS or ASBS braking in low traction, compliant, readily yielding contaminants, which often is little to none, or what is present within or on the media in which the steering action is taking place. Examples of this steering control traction requirement could be an aircraft or automobile braking while steering on dry asphalt where aggressive, but not maximum, braking might require 0.4 g braking traction, so, if the pavement and the tires are capable of generating 0.7 g or 0.8 g traction, first, the ABS or the ASBS systems will not be required to cyclically modulate braking pressure because the anti-slip sensor will not see any slip above the ~10% or 20% (or tire deceleration above 0.40 g) where the ABS/ASBS signal would cause anti-lock or anti-skid valve actuation respectively, and the steering traction that remains available might allow a car needing about 0.3 g to execute a 50 kph, 66 meter radius turn). A second example might be an automobile with snow tires that are 'viscous hydroplaning' in wet snow, an ABS system not allowing the tires to skid or slip down through the compliant contaminant to the more tractive surface that the tires would come in contact under the snow if they were 'non-ABS' braked/skidded/slipped down through the compliant, readily yielding snow, the tire to compact snow only generating 0.1 g traction available and the automobile not only taking a long time to decelerate, it would have very little lateral force traction available and could not negotiate more than a 30 kph 66 meter turn (requiring 0.107 g) even if the brakes were completely disengaged, which also prevents the vehicle from slowing down and being able to negotiate smaller radius or higher speed and same radius turns.

Accordingly, there is a need for a system that addresses the foregoing shortcomings of current systems.

Since ABS and ASBS systems do not sense surface contaminants, and act in contaminants the same way as they act on dry pavement, they react differently in contaminant than an operator would searching for threshold braking and steering. An example, with tires not slipping or skidding down through a compliant and yielding contaminant like wet snow to a more tractive hard surface underneath, an operator cannot execute cadence braking, where a non ABS braking system allows an automobile operator to pump the brakes to higher pressures, with resulting higher wheel decelerations, allowing the tires to skid or slip down through the wet snow to a higher traction surface underneath. In compliant contaminated surface conditions this cadence braking can provide both better stopping and directional control as the intervals provide both the opportunity to correct any unasked for directional instability, like fishtailing or oversteer, while the brakes are 'off', as well as asked for directional stability like enhancing reduced understeer because the vehicle can execute either slower, lower lateral forces required turns, as well as enhance steering traction the tires may enjoy beneath the compliant and yielding wet snow at the maximum traction slip values that occur just before and after any operator induced near or full lock up of the wheels.

At high air and ground speeds aircraft with ASBS, much, if not most of the higher speed directional control of the aircraft is provided by controlling the airflow on the rudder(s), with the normally non-braked nose gear providing some directional control and stability, especially in strong crosswind situations and at lower air and ground speeds. In some instances, when aircraft ASBS may not be acquiring the wheel braking that might be available at higher, non ASBS slip values, when operating on contaminated surfaces, additional braking may be sought through the use of extra, or extended use of maximum reverse thrust. Of the several factors that affect wheel braking and directional control on contaminated surfaces the fact that poorer wheel braking conditions do not transfer as much weight to the nose gear, and aerodynamic braking occurs above the landing gear wheel braking wheels that are the pivoting point of weight transfer to the nose gear wheels, any extra or additional aerodynamic aircraft braking will have the tendency to lower the weight on the nose gear. An example of why diminished wheel braking on contaminated surfaces could affect directional control would be in a situation where an aircraft is landing on wet snow in a strong crosswind, has poor wheel braking so there is less weight transferred to the nose gear, and the nose gear has low influence on directional control because the tires are traveling in and on top of compliant and traction yielding snow, the aircraft crew asks for maximum aerodynamic braking, all taking place above the landing gear weight transfer pivot area, removing additional weight from an already low traction acquiring nose gear wheel set, while at the same time reverse thrust possibly blanking rudder airflow, further reducing directional stability and the strong cross wind mass impacting the aircraft ahead of the landing gear in what could be described, in average, as first class leverage, while the remaining or unblanked diminished air flow passing the rudder, that is acting on the directional control of the front of CoG of the aircraft in what could be described as third class leverage both contribute to the cross wind's affect of causing the front of the aircraft to move in the direction of the strong crosswind and possibly contribute to a veer off excursion to the side of a runway, all enhanced by the braking system not operationally recognizing and reacting to surface conditions.

The present invention provides a control system that senses real time operating and surface conditions and vehicle control and reactions and optimizes wheel braking and directional control by acting differently and appropriately in sensed different conditions to optimize wheel braking and directional control based on all of the sensed and dynamically changing operating conditions and surfaces, and vehicle dynamics information, as wheel braking and or directional control are commanded.

The present invention may, in different conditions use, but not be limited to the use of the following sensors: vehicle velocity and wheel angular velocity and accelerations sensors, inertial measurement systems, GPS and other three dimensional position, velocity and location sensors, surface and ambient temperature sensors, surface and pavement friction measurement sensors, braking availability sensors, lateral, longitudinal, and vertical speed and acceleration sensors, axles' and wheels' lateral force sensors, brake pedal and steering controls position sensors, steering wheel turning force sensors, contaminant drag and rolling resistance sensors, brake pedal pressure sensors, brake pressure sensors, wheel braking torque sensors, weight on wheel(s) sensors, steering control input pressure sensors, tire pressure sensors, lateral, longitudinal and vertical tire forces sensors, ground vehicle, aircraft, water vehicle, subterranean, subterranean vehicle, attached equipment, combination equipment, trailers and drones, yaw, pitch and roll sensors, static and dynamic center of gravity sensors or systems, dynamic vehicle stability sensors, dynamic operator control sensors, and reaction to system feedback sensors. Other non-vehicle sensors and inputs may include operator inputs, weather, RWIS (Road Weather Information Systems, including residual sand, abrasives and chemicals etc.), 3D infrastructure inputs (like elevation, slope) and other data that will become more available with time from autonomous vehicles and their sensors (like LIDAR, RADAR, GPS/GIS, signage, and hazard notification etc.), as well as other data that may be provided through local area and vehicle to vehicle networks, the Internet, or the industrial internet of things through various communications means. Other hybrid in/ex vehicle systems like, but not limited to anti-collision systems may provide inputs to ABADCS.

When braking and or directional control is requested by the operator, in the present invention, the control module will poll and or accept and or interrogate sensor data, algorithms and or available data and the control model algorithm will output commands to the braking and or steering systems that allow for more comprehensive investigation or sensing of the surfaces in or on which the vehicles tires are operating, and at the same time investigate or sense how the vehicle is responding to the real time output commands from the control model (See FIG. 1). One example of this operational protocol would be an automobile being driven on wet snow is operator controlled to brake. Pedal position, pedal pressure, brake pressure, wheel speeds, wheel decelerations are all being sensed using sensors and all sensed information is being monitored by the control module. Through the plethora of sensory data available to it, the control module can sense when as the brake pressure increases, tire slip increases more rapidly, and through the normal dry, hard surface friction slip regime but the vehicle is not decelerating as would be predicted on an average dry hard surface, nor has the brake pressure been increased to the point where it would if the brakes were trying to slow a vehicle with tire slip rates in the 10-20% 'sweet' spot dry pavement friction slip regime. If the operator continues to depress the brake pedal further, or increases the brake pedal pressure, the control recognizes the brake pedal sensor outputs as the operator is looking for more braking and commands an increase in brake pressure, and monitors the wheels' angular velocity decelerations and the vehicle's deceleration and searches for the best slip and brake pressure values at each wheel to provide the best braking and directional control. Brake pressure is modulated at a certain frequency near where the highest vehicle deceleration has been noted, possibly by wheel braking torque sensors, or by vehicle deceleration sensors, and as long as vehicle deceleration values remain highest within a certain range of brake pressure and or wheel speed modulation this continues until the vehicle is stopped, or until the operator lessens brake pedal pressure, or the vehicle does something it has not been controlled to do, like fishtail/oversteer, or does not do something it has been controlled to do, like understeer. When one of these uncontrolled events occur, the control module, having received sensed, and continuing to receive sensed surface conditions (like maximum non-locked wheel braking availability is occurring at 92% wheel slip, or there is significant contaminant wheel drag indicating the presence of a significant layer of contaminant), and how the vehicle is responding to controls, determines that the vehicle is undergoing unrequested yaw, or fishtailing due to loss of traction at the rear wheels, with the front wheels, front of vehicle still responding well to steering input, rear wheel braking might be controlled to anti-lock, or to increased wheel braking as the system could very rapidly cycle through each to determine the best way to regain complete directional control, and or vehicle braking, and or measure and optimization of overall vehicle control. I.e. Do the operator control inputs indicate the operator is seeking more braking than steering, more steering than braking, or, generally, more overall vehicle control in different situations. Examples: where more steering than braking may be desired to avoid a collision (possibly detected by autonomous vehicle sensor systems like radar) where a steer around solution is available, or more braking than steering may be desired to avoid or mitigate a collision that cannot be avoided by a steer around.

In the present invention sensors output to the control module will provide information about surface conditions like low traction available (i.e. the sensed wheel angular velocities are decelerating rapidly, but the vehicle is not), vehicle dynamics like weight on wheels and like various vehicle accelerations, how the vehicle is being controlled, like how much braking, steering and various vehicle accelerations are being asked for, and how the vehicle is responding to the requested control inputs.

In the present invention the control module will interpret and evaluate the sensed information and if the vehicle is responding in direct reconciliation with how the operator (person or computer operator) is controlling the vehicle then the control module will not modify how the vehicle braking and directional control systems are being person or computer controlled.

In the present invention the control module will interpret and evaluate the sensed information and if the vehicle is not responding in direct reconciliation with how the operator (person or computer operator) is controlling the vehicle then the control module will modify the vehicle braking and directional control systems.

In the present invention, when required, the control module will provide braking and directional control outputs according to threshold braking and threshold steering optimizing algorithms.

According to one embodiment of the present invention the sensor output data, the control output data and any changing sensor output data and control output data will be stored on a digital storage media and be available for downloading for a certain length of time.

It is contemplated that the sensor output data, the control output data and any changing sensor output data and control output data may be stored on a digital storage media and be available for downloading for a certain length of time before being overwritten, and will be available for download into an ex-vehicle machine learning module where it can be analyzed, interrogated assessed and or utilized as required.

It is also contemplated that the sensor output data, the control output data and any changing sensor output data and control output data may be stored on a digital storage media and be available for downloading for a certain length of time before being overwritten, and will be available for download into an ex-vehicle machine learning module where it can be analyzed, interrogated assessed and or utilized as required, and will be available for processing into an in- or ex-vehicle machine learning/artificial intelligence and teaching module that can or will alter original threshold braking and threshold directional control algorithms.

In one embodiment of the present invention sensor data can be integrated into current, or appropriately modified electronic traction and stability control systems.

In another embodiment of the present invention sensor data may be integrated into an appropriate electronic traction control and electronic stability control threshold braking and directional control system that optimizes traction made available by the present invention to assist in tires acquiring maximum braking and directional control traction in current sensed surface conditions and vehicle dynamics.

In another embodiment of the present invention, audio, visual, tactile, and 'readable' digital feedback may be provided to person or computer operators respectively providing status feedback like amount of control provided in comparison to control requested. This feedback may be used to familiarize person or computer (through machine learning) operators how a vehicle is being operated and controlled in observed conditions, and lead to more initial and continued nuanced control on contaminated surfaces conditions.

In another embodiment of the present invention a vehicle may sense and use data from on board vehicle sensors like drive line torque, or comparing wheel speeds to vehicle velocity, to determine that low traction conditions exist in real time (and system may do this if vehicle has Electronic Traction Control (ETC) systems enabled, or similar, by momentarily interrupting systems if they have been triggered) to monitor if there is more traction and acceleration available than ETC or equivalent is delivering, and, if this is the case, both warn the driver through alerts that vehicle may be traveling on a low tractive surface, and also inform the ABADCS that this condition may exist, and using, as examples, GIS and or radar that vehicle is approaching a stop sign or obstacle like another vehicle if a collision would be probable if vehicles remain on existing courses of travel, respectively, warn the operator as early as possible that such a situation exists, and, if operator has not applied the brakes early enough, or aggressively enough to prevent a collision or stop within a required distance in the perceived conditions, enable and or optimize the ABADCS to minimize the risk or harm.

It is further contemplated that the data from wheel speed sensors, brake pressures sensors, axle braking forces sensors, aircraft deceleration sensors may be input into control module and the aircraft iteration of the present invention to limit global (versus wheel and tire) aircraft braking and global aircraft deceleration to prevent tire damage or failure.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims and their equivalents.

What is claimed is:

1. A method of controlling and optimizing braking and directional control of a vehicle operated on a contaminated, compliant, or non-compliant surface; the method comprising steps of
    collecting data from a plurality of sensors, the data being indicative of a condition of the contaminated, compliant, or non-compliant surface;
    sending the data to a neural controller having an algorithm configured to process the data, wherein the algorithm includes:
    determining optimum braking and directional control instructions for the vehicle,
    generating warnings and alerts based on the calculated optimum braking and directional control instructions, and
    sending the optimum braking and directional control instructions to a braking and steering system of the vehicle and the warnings and alerts to an alert and warning system of the vehicle;
    adjusting the steering and directional control of the braking and steering system in accordance with the optimum braking and directional control instructions provided by the neural controller, and
    sending a command from a user to the braking and steering system of the vehicle to increase braking or steering in excess of the optimum braking and steering instructions provided by the neural controller.

2. The method of controlling and optimizing braking and directional control of a vehicle according to claim 1, wherein after said step of generating warnings and alerts, a step of generating an arming signal to a semi or fully autonomous braking system to pre-arm the braking and steering system based on real time conditions that are present when vehicle needs to be braked, and/or directionally controlled.

3. The method of controlling and optimizing braking and directional control of a vehicle according to claim 1, wherein the user is at least one of a computer and an autonomous machine computer.

4. The method of controlling and optimizing braking and directional control of a vehicle according to claim 1, wherein the neural controller is activated prior to detecting the contaminated, compliant, or non-compliant surface.

5. The method of controlling and optimizing braking and directional control of a vehicle according to claim 4, wherein the vehicle is one of a manual, a semi-autonomous and an autonomous vehicle.

6. The method of controlling and optimizing braking and directional control of a vehicle according to claim 4, wherein the neural controller is configured to repeatedly monitor the condition of the contaminated, compliant, or non-compliant surface and send updated braking and directional control instructions to the braking and steering system of the vehicle.

7. The method of controlling and optimizing braking and directional control of a vehicle according to claim 2, wherein the neural controller is configured to repeatedly monitor the condition of the contaminated, compliant, or non-compliant surface and send updated braking and directional control instructions to the braking and steering system of the vehicle wherein the pre-arming of the semi- and fully autonomous braking systems can be adapted in real time based on real time conditions.

8. The method of controlling and optimizing braking and directional control of a vehicle according to claim 1, wherein the neural controller is part of a network that includes a plurality of neural controllers in other vehicles, the neural controller communicating with the plurality of neural controllers for relaying data regarding the contaminated or non-compliant surface.

9. The method of controlling and optimizing braking and directional control of a vehicle according to claim 1, wherein the neural controller is part of a network that includes a plurality of neural controllers in other vehicles, the neural controller communicating with the plurality of neural controllers for relaying alerts and warnings regarding the contaminated or non-compliant surface.

10. The method of controlling and optimizing braking and directional control of a vehicle according to claim 1, wherein maximum braking forces cannot exceed a level causing unacceptable damage to tires or other components of the vehicle.

11. The method of controlling and optimizing braking and directional control of a vehicle according to claim 10, wherein the neural controller is configured to adjust the optimal braking and directional control instructions to reduce the risk of tire failure.

12. The method of controlling and optimizing braking and directional control of a vehicle according to claim 10, wherein the vehicle is an aircraft.

13. The method of controlling and optimizing braking and directional control of a vehicle according to claim 1, further comprising of a step of collecting data from the plurality of sensors, the data being indicative of a condition of the aerodynamics of the vehicle.

14. A method of controlling and optimizing braking and directional control of a vehicle operated on a contaminated, compliant, or non-compliant surface; the method comprising steps of
    collecting data from a plurality of sensors, the data being indicative of a condition of the contaminated, compliant, or non-compliant surface;

sending the data to a neural controller having an algorithm configured to process the data, wherein the algorithm includes:
  determining optimum braking and directional control instructions for the vehicle,
  generating warnings and alerts based on the calculated optimum braking and directional control instructions, and
  sending the optimum braking and directional control instructions to a braking and steering system of the vehicle and the warnings and alerts to an alert and warning system of the vehicle; and
adjusting the steering and directional control of the braking and steering system in accordance with the optimum braking and directional control instructions provided by the neural controller,
wherein the neural controller is part of a network that includes a plurality of neural controllers in other vehicles, the neural controller communicating with the plurality of neural controllers for relaying data regarding the contaminated or non-compliant surface, and
wherein the neural controller is configured to use data for the plurality of neural controllers for adjusting the braking and directional control instructions sent to the braking and steering systems of the vehicle.

15. An apparatus for controlling and optimizing braking and directional control of a vehicle, the apparatus comprising:
  a plurality of sensors configured to determine a condition of a contaminated, compliant, or non-compliant surface;
  an alert and warning system;
  a braking and steering system of the vehicle; and
  a controller configured to:
    collect data from the plurality of sensors, the data being indicative of the condition of the contaminated, compliant, or non-compliant surface;
    send the data to a neural controller having an algorithm configured to process the data, wherein the algorithm includes:
      determining optimum braking and directional control instructions for the vehicle,
      generating warnings and alerts based on the calculated optimum braking and directional control instructions, and
      sending the optimum braking and directional control instructions to the braking and steering system of the vehicle and the warnings and alerts to an alert and warning system of the vehicle; and
    adjust the steering and directional control of the braking and steering system in accordance with the optimum braking and directional control instructions provided by the neural controller, and
    sending a command from a user to the braking and steering system of the vehicle to increase braking or steering in excess of the optimum braking and steering instructions provided by the neural controller.

16. The apparatus for controlling and optimizing braking and directional control of a vehicle, according to claim 15, wherein the vehicle is an aircraft.

17. The apparatus for controlling and optimizing braking and directional control of a vehicle according to claim 15, wherein said algorithm includes generating warnings and alerts, a step of generating an arming signal to a semi or fully autonomous braking system to pre-arm the braking and steering system based on real time conditions that that are present when vehicle needs to be braked, and/or directionally controlled.

* * * * *